(12) United States Patent
Echigoya et al.

(10) Patent No.: US 11,645,480 B2
(45) Date of Patent: May 9, 2023

(54) METHOD OF MANUFACTURING MULTILAYER CHIP COMPONENT

(71) Applicant: TDK CORPORATION, Tokyo (JP)

(72) Inventors: Gaku Echigoya, Tokyo (JP); Hiroshi Satou, Tokyo (JP); Keijiro Ishida, Tokyo (JP); Hajime Kudo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 165 days.

(21) Appl. No.: 17/166,052

(22) Filed: Feb. 3, 2021

(65) Prior Publication Data

US 2021/0248327 A1   Aug. 12, 2021

(30) Foreign Application Priority Data

Feb. 6, 2020   (JP) .............................. JP2020-018693

(51) Int. Cl.
*G06K 1/12*    (2006.01)
*H01G 4/002*   (2006.01)
*G06K 19/06*   (2006.01)

(52) U.S. Cl.
CPC ............... *G06K 1/12* (2013.01); *H01G 4/002* (2013.01); *G06K 19/06037* (2013.01)

(58) Field of Classification Search
CPC ..... G06K 19/06037; G06K 1/12; H01G 4/002
See application file for complete search history.

(56) References Cited

U.S. PATENT DOCUMENTS

| | | | |
|---|---|---|---|
| 2006/0051562 A1* | 3/2006 | Sakuma | G06K 19/16 |
| | | | 428/195.1 |
| 2012/0019982 A1* | 1/2012 | Sasaki | H01G 4/002 |
| | | | 361/321.1 |
| 2018/0096775 A1 | 4/2018 | Shibuya et al. | |
| 2020/0350110 A1 | 11/2020 | Shibuya et al. | |

FOREIGN PATENT DOCUMENTS

| | | | | |
|---|---|---|---|---|
| JP | 2018-056475 A | 4/2018 | | |
| WO | WO-2005121048 A1 * | 12/2005 | ........... | C04B 41/009 |
| WO | WO-2018212119 A1 * | 11/2018 | ......... | H01F 17/0013 |

* cited by examiner

*Primary Examiner* — Laura A Gudorf
(74) *Attorney, Agent, or Firm* — Oliff PLC (57) ABSTRACT

In a method of manufacturing a multilayer chip component according to an aspect of the present disclosure, laser processing is used for forming dots of a two-dimensional code. This laser processing is laser processing with respect to a laminate substrate in a state before baking is performed, and an impact at the time of processing is absorbed to a certain degree due to elastic deformation of the laminate substrate. For this reason, according to the manufacturing method, occurrence of cracking can be curbed compared to laser processing with respect to an element body in a state after baking is performed.

20 Claims, 8 Drawing Sheets

METHOD OF MANUFACTURING MULTILAYER CHIP COMPONENT

CROSS-REFERENCE TO RELATED APPLICATIONS

This application is based upon and claims the benefit of priority from Japanese Patent Application No. 2020-18693, filed on 6 Feb. 2020, the entire contents of which are incorporated herein by reference.

TECHNICAL FIELD

The present disclosure relates to a method of manufacturing a multilayer chip component.

BACKGROUND

Japanese Unexamined Patent Publication No. 2018-56475 (Patent Document 1) discloses an electronic component in which a display portion is provided in a drum core of a magnetic body. This document discloses a technology for marking a two-dimensional code as a display portion using a laser.

SUMMARY

In an electronic component according to the technology in the related art described above, during laser marking, a situation in which cracking occurs in a drum core that is a sintered body may occur. Such cracking may cause a situation in which characteristics of an electronic component deteriorate or a situation in which an electronic component malfunctions.

According to the present disclosure, a method of manufacturing a multilayer chip component, in which laser processing is employed and occurrence of cracking can be curbed, is provided.

According to an aspect of the present disclosure, there is provided a method of manufacturing a multilayer chip component including a step of forming a code including a plurality of dot-shaped recesses arranged through laser processing on a main surface of a laminate substrate, a plurality of green sheets are laminated in the laminate substrate, and a step of forming an element body for a multilayer chip component provided with the code on a main surface by performing dividing and baking with respect to the laminate substrate.

In the foregoing manufacturing method, laser processing is used for forming dot-shaped recesses of a code. Since it is laser processing with respect to a laminate substrate in a state before baking is performed, occurrence of cracking can be curbed compared to laser processing with respect to an element body in a state after baking is performed.

The method of manufacturing a multilayer chip component according to the aspect may further include a step of rounding corners of the element body by performing barrel polishing of the element body.

In the method of manufacturing a multilayer chip component according to the aspect, depth of the dot-shaped recess may be shorter than a radius of curvature of the corners of the element body.

In the method of manufacturing a multilayer chip component according to the aspect, the dot-shaped recess may have a circular shape in a plan view.

In the method of manufacturing a multilayer chip component according to the aspect, the dot-shaped recess may have a semicircular cross-sectional shape.

In the method of manufacturing a multilayer chip component according to the aspect, the element body may include a surface layer constituting a main surface and a functioning layer positioned inside, and depth of the dot-shaped recess may be shorter than a thickness of the surface layer.

In the method of manufacturing a multilayer chip component according to the aspect, in the step of forming a code, the code may be formed on a film provided on the main surface of the laminate substrate.

In the method of manufacturing a multilayer chip component according to the aspect, in the element body, depth of the dot-shaped recess may be longer than a separation distance between two of the dot-shaped recesses adjacent to each other.

In the method of manufacturing a multilayer chip component according to the aspect, in the step of forming a code, the code indicating at least information identifying an intermediate product in a previous stage and information identifying an individual finished product may be formed.

In the method of manufacturing a multilayer chip component according to the aspect, the information identifying an intermediate product in a previous stage may be information identifying the laminate substrate.

DETAILED DESCRIPTION

Hereinafter, an embodiment of the present disclosure will be described in detail with reference to the accompanying drawings. In the description, the same reference signs are used for the same elements or elements having the same function, and duplicate description will be omitted.

Figure 1:
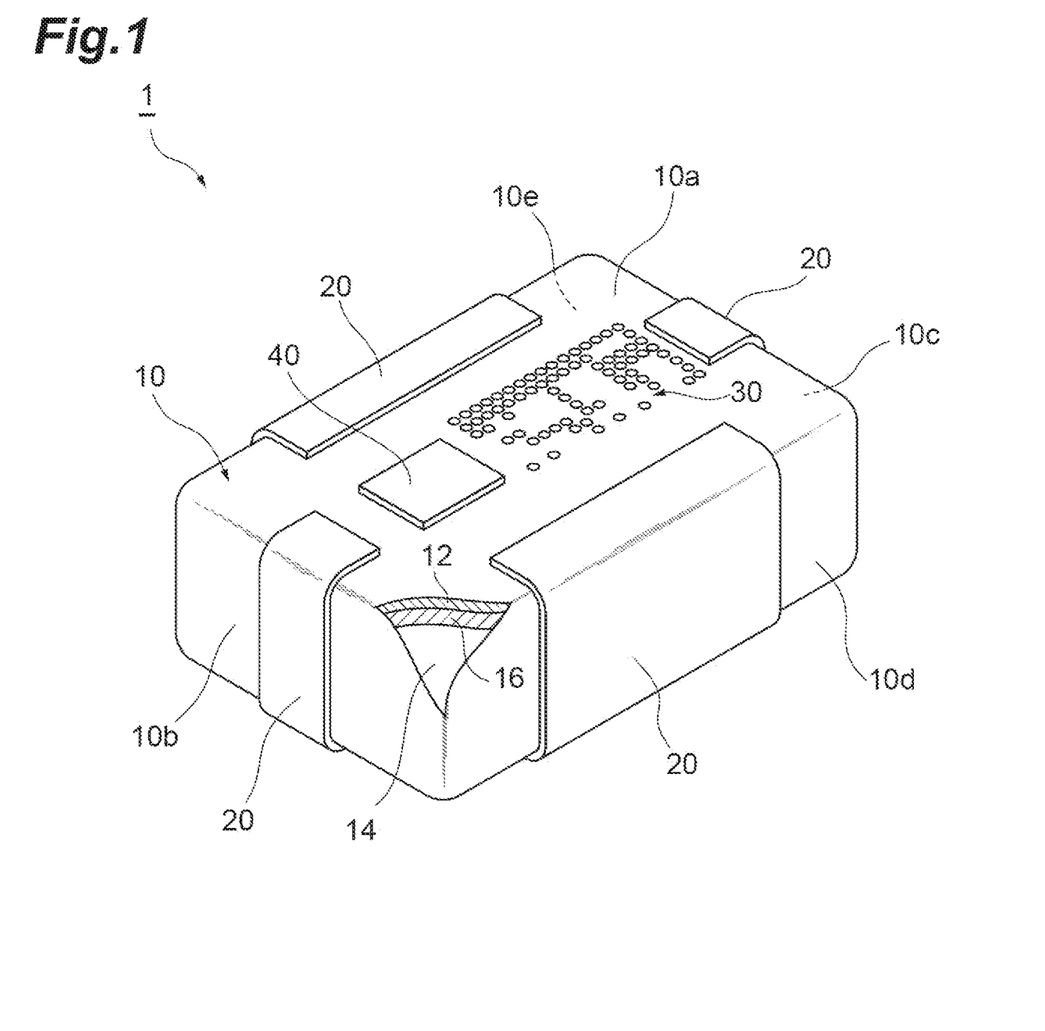
FIG. 1 is a schematic perspective view of a multilayer chip component according to an embodiment.
Figure 2:
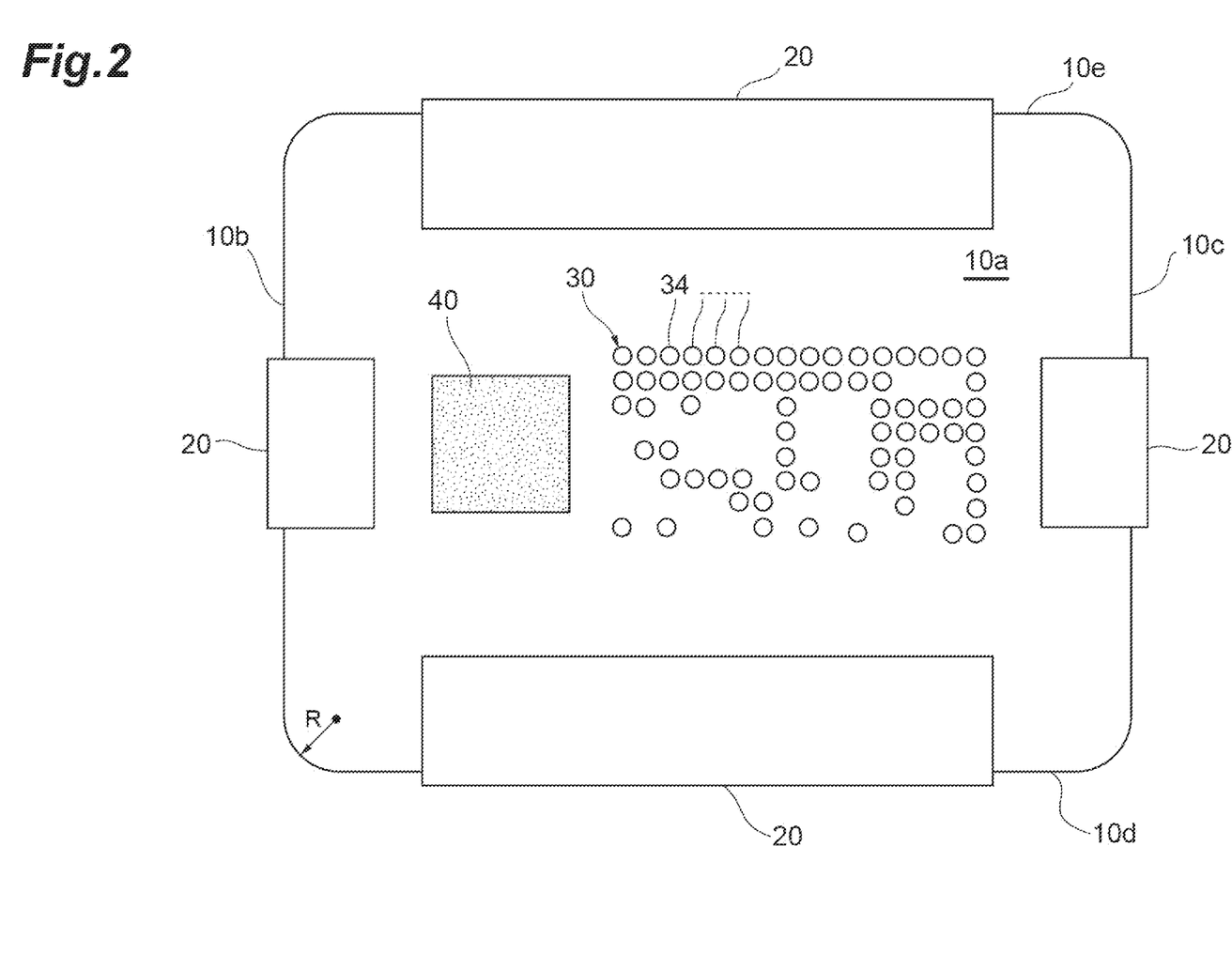
FIG. 2 is a view illustrating a two-dimensional code formed on a main surface of the multilayer chip component.
Figure 3:
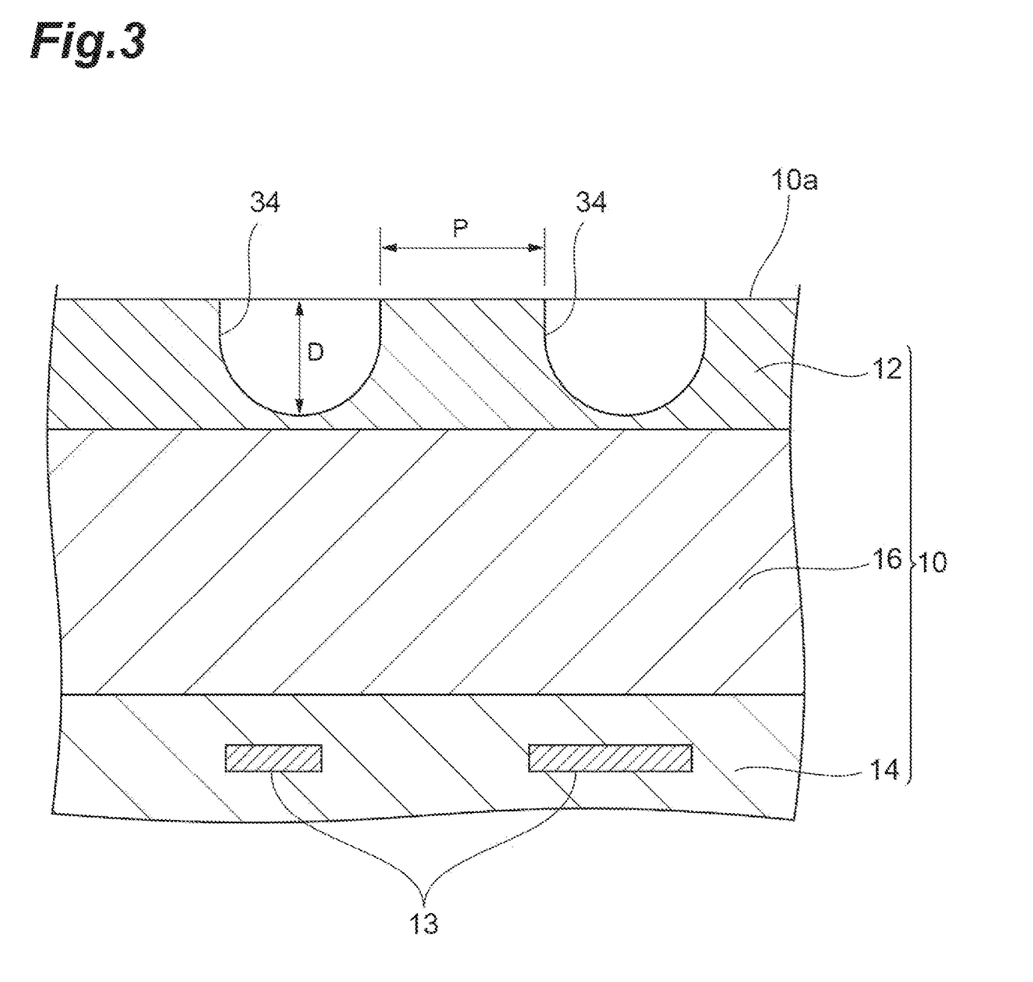
FIG. 3 is an enlarged cross-sectional view of dots included in the two-dimensional code in FIG. 2.

First, with reference to FIGS. 1 to 3, a configuration of a multilayer chip component 1 according to the embodiment will be described.

The multilayer chip component 1 is an electronic component including an element body 10 and a plurality of electrodes 20.

The element body 10 has a lamination structure including a plurality of glass ceramic layers, and internal electrode layers are provided in a part between the ceramic layers. For example, the glass ceramic layers contain 50 to 70 weight % of glass as a main component and contain 30 to 50 weight % of an alumina component. For example, the internal electrode layers constitute coils or capacitors or constitute filters including a coil and a capacitor. The element body 10 has substantially a rectangular parallelepiped external shape, and all corners thereof are rounded. As an example of dimensions thereof, the element body 10 has a long side length of 2.5 mm, a short side length of 2.0 mm, and a thickness of 0.9 mm. A radius R of curvature of each corner of the element body 10 is within a range of 0.05 to 0.5 mm (as an example, 0.1 mm) The element body 10 has an upper surface 10*a* (main surface), a pair of end surfaces 10*b* and 10*c* facing each other in a long side direction, and a pair of side surfaces 10*d* and 10*e* facing each other in a short side direction. The upper surface 10*a* of the element body 10 is constituted of a surface layer 12, and a cover layer 16 is interposed between a functioning layer 14, in which internal electrode layers 13 are provided, and the surface layer 12. The surface layer 12 has a thickness within a range of 10 to 30 μm (as an example, 20 μm), and the cover layer 16 has a thickness within a range of 30 to 50 μm (as an example, 40 μm). The cover layer 16 is designed to be thicker than the surface layer 12.

Each of the electrodes 20 is provided on a surface of the element body 10 and is connected to each of the internal electrode layers exposed to the end surfaces 10*b* and 10*c* and the side surfaces 10*d* and 10*e* of the element body 10. In the present embodiment, four electrodes 20 in total, that is, a pair of end surface electrodes 20 provided on the end surfaces 10*b* and 10*c* and a pair of side surface electrodes 20 provided on the side surfaces 10*d* and 10*e*, are provided. Each of the electrodes 20 wraps around the element body 10 to the main surface 10*a* side and covers a part of an outer edge region on the main surface 10*a*.

A two-dimensional code 30 and a direction identification mark 40 are provided in a central region on the main surface 10*a* of the element body 10.

For example, the two-dimensional code 30 is a code conforming to regulations, such as a data matrix code, a QR code (registered trademark), and a micro QR code. The two-dimensional code 30 may be a matrix type or a stack type. In the present embodiment, the two-dimensional code 30 is a matrix-type data matrix code, and dots 34 are provided in parts of cells (8×16). A formation region of the two-dimensional code 30 has a rectangular shape (as an example, 1020 μm×560 μm) extending in the long side direction of the element body 10. Each of the dots 34 has a circular shape in a plan view and has a diameter within a range of 20 to 50 μm (as an example, 40 μm). In the two-dimensional code 30, a separation distance (that is, a pitch P) between two dots 34 adjacent to each other is within a range of 5 to 40 μm (as an example, 25 μm). As illustrated in FIG. 2, each of the dots 34 is a recess (that is, a dot-shaped recess) provided on the main surface 10*a* of the element body 10 through laser processing and has substantially a semicircular cross-sectional shape. That is, substantially no corner portions are present in a cross-sectional shape of each of the dots 34, which thereby have sufficient smoothness. Each of the dots 34 exhibits a mortar shape in a three-dimensional manner. In this application, a semicircular cross-sectional shape includes not only a semicircular shape having a central angle of 180 degrees at the center of curvature but also a semicircular shape having a central angle smaller than 180 degrees (arc shape) at the center of curvature and a semicircular shape including a straight part (U shape). That is, the two-dimensional code 30 is an aggregate of a plurality of arranged dot-shaped recesses. Each of the dots 34 is designed to have a depth D shorter than the thickness of the surface layer 12, and each of the dots 34 is adjusted such that it does not reach the cover layer 16. In addition, each of the dots 34 is designed to have the depth D shorter than the radius R of curvature of the corners of the element body 10 (D<R). Moreover, each of the dots 34 is designed to have the depth D shorter than the pitch P of the two-dimensional code 30 (D<P). In the present embodiment, the depth of each of the dots 34 is within a range of 5 to 30 μm (as an example, 15 μm). In the present embodiment, a color of the surface layer 12 is white, and a color of each of the dots 34 is also white.

The two-dimensional code 30 can indicate information as a plurality of digits. For example, the two-dimensional code 30 can indicate information of 22 digits in numerical characters or alphabetical characters. The information of a plurality of digits indicated by the two-dimensional code 30 includes an individual body ID that is information identifying the multilayer chip component 1 and a substrate ID that is information identifying a laminate substrate 54 that is an intermediate product used when the multilayer chip component 1 is manufactured.

The direction identification mark 40 is a mark for distinguishing the direction or the polarity of the multilayer chip component 1 based on the appearance thereof. The direction identification mark 40 has a square shape (as an example, 400 μm×400 μm) in a plan view and is adjacent to the two-dimensional code 30 in the long side direction of the element body 10. For example, the direction identification mark 40 is formed of metal oxide such as $ZrO_2$ and is adjusted to have a dark color such as black.

Figure 4:
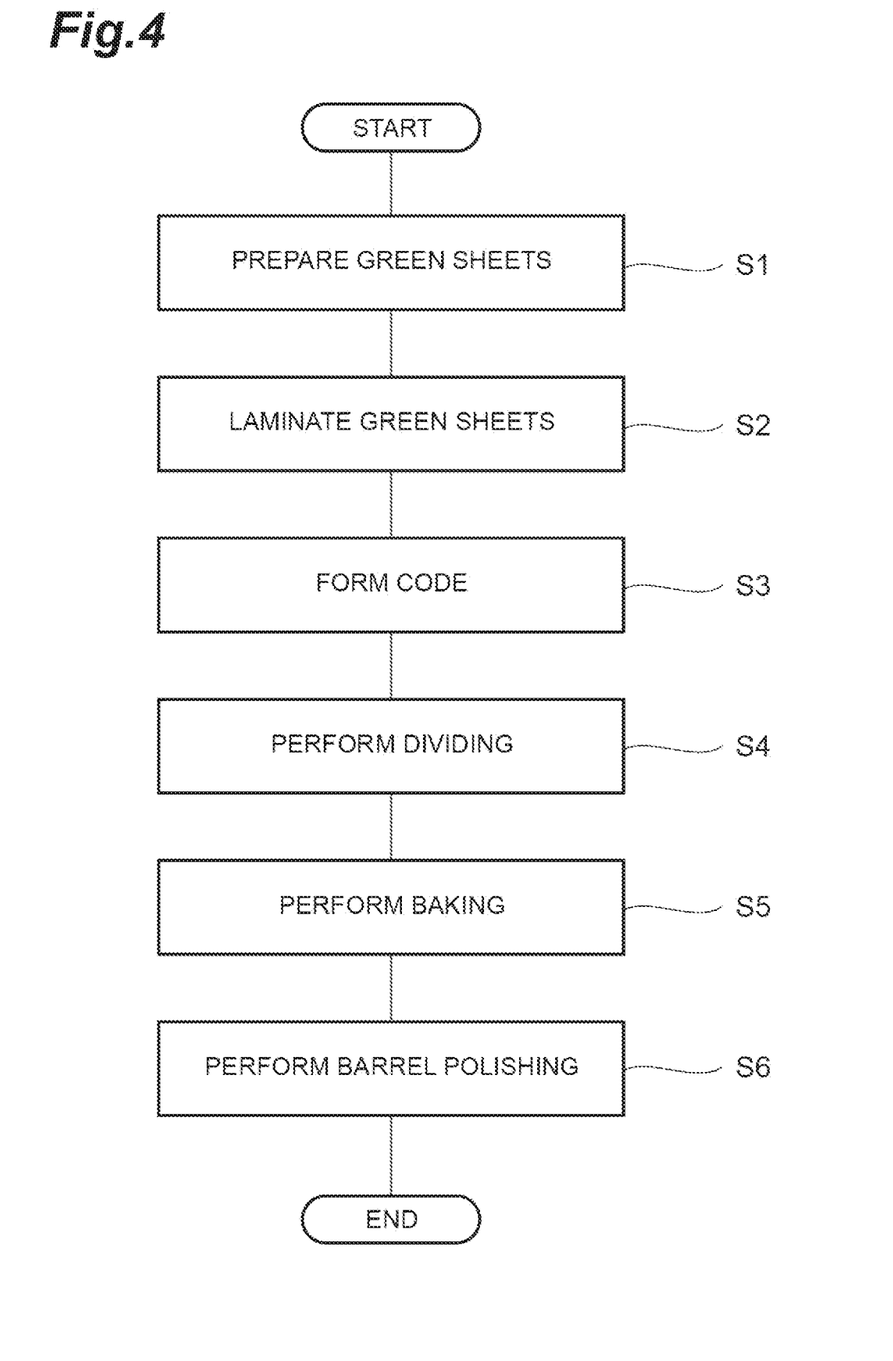
FIG. 4 is a flowchart illustrating a method of manufacturing a multilayer chip component according to the embodiment.

Subsequently, a procedure of manufacturing the multilayer chip component 1 described above will be described with reference to the flowchart in FIG. 4.

Figure 5:
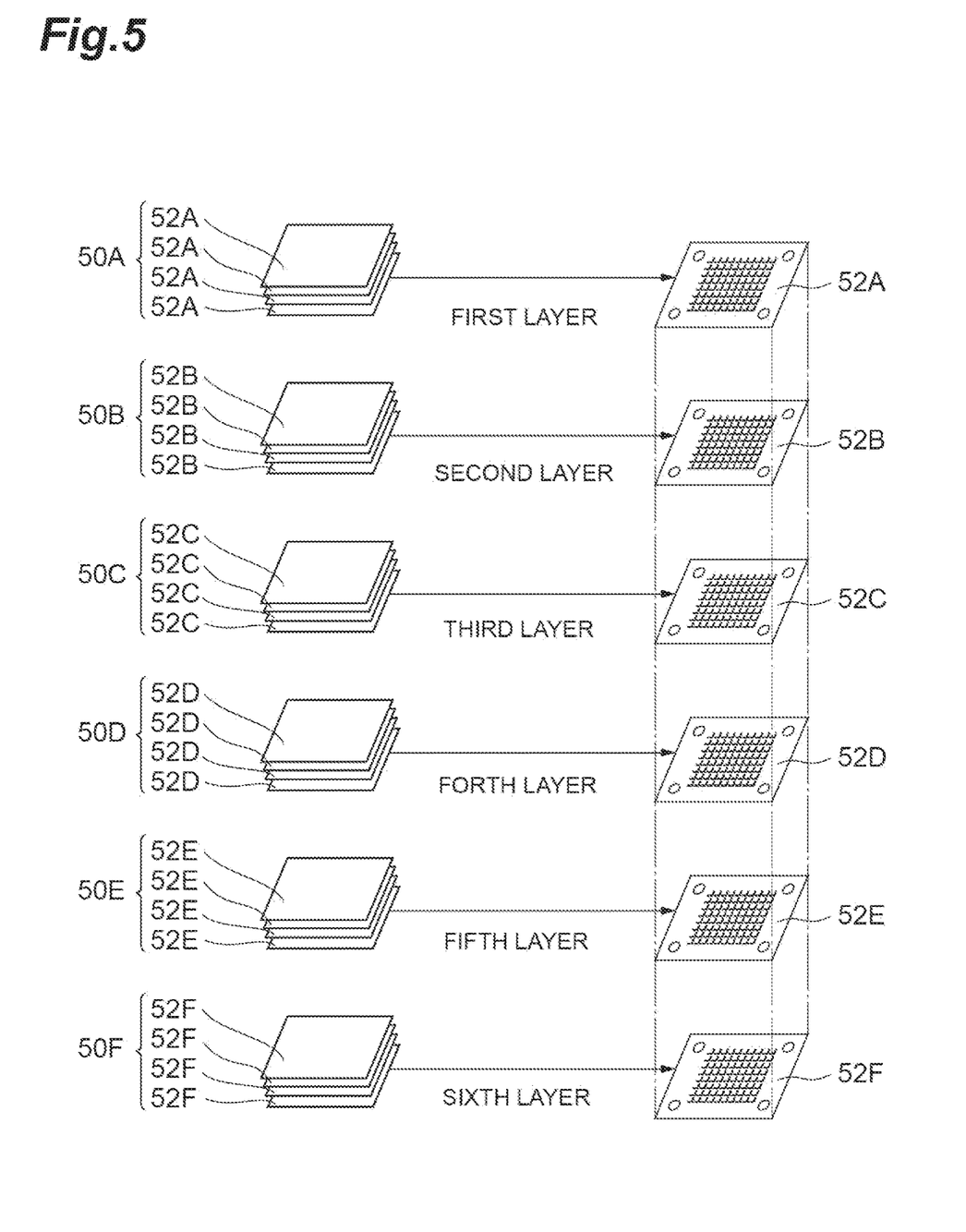
FIG. 5 is a view illustrating a step of the manufacturing method according to the embodiment.

When the multilayer chip component 1 is manufactured, in Step S1, glass green sheets constituting the ceramic layers of the element body 10 are prepared. In the present embodiment, as illustrated in FIG. 5, a plurality of sheet groups 50A to 50F respectively corresponding to the ceramic layers are prepared. All the green sheets included in each of the sheet groups 50A to 50F are formed from the same sheet roll through punching. The plurality of sheet groups 50A to 50F may be formed from the same sheet roll or may be formed from different sheet rolls. Further, a pattern for a predetermined internal electrode layer is formed in each of the sheet groups 50A to 50F. For example, a pattern for an uppermost internal electrode layer is formed in green sheets 52A of the sheet group 50A. At this time, a sheet ID that is information identifying a green sheet and a code (for example, a two-dimensional code) indicating a sheet roll ID that is information identifying a sheet roll used for the green sheet may be formed in a margin region (for example, an outer edge region) of each of the green sheets 52A to 52F. In this case, it is possible to accurately and quickly discern which sheet roll a green sheet is manufactured from by reading the code, and thus high traceability can be realized.

In Step S1, in addition to the green sheets 52A to 52F which will become the functioning layer 14, a green sheet which will become the surface layer 12 and a green sheet which will become the cover layer 16 are also prepared.

Figure 6:
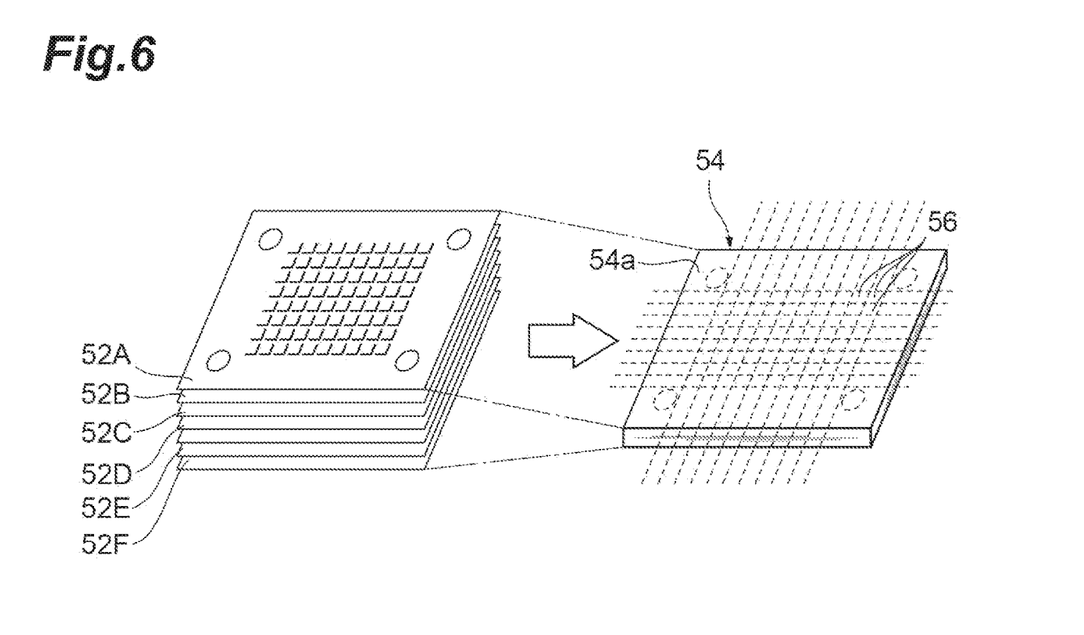
FIG. 6 is a view illustrating another step of the manufacturing method according to the embodiment.

Next, in Step S2, as illustrated in FIG. 6, the green sheets 52A to 52F described above are laminated. At this time, in addition to the green sheets 52A to 52F which will become the functioning layer 14, a green sheet which will become the surface layer 12 and a green sheet which will become the cover layer 16 are also laminated. Further, pressing is performed in a lamination direction, and the laminate substrate 54 in which a plurality of green sheets are laminated can be obtained. The laminate substrate 54 is an intermediate product which will be divided into a plurality of green chips, and a plurality of individual regions 56 are arranged in a matrix shape (for example, 8 rows×10 columns).

Thereafter, in Step S3, the two-dimensional code 30 described above is formed on the laminate substrate 54. Specifically, the two-dimensional code 30 is formed in each of the plurality of individual regions 56 on a main surface 54a of the laminate substrate 54. In one laminate substrate 54, the two-dimensional code 30 formed in each of the individual regions 56 varies with each of the individual regions 56. The two-dimensional code 30 is formed before a dividing step (Step S4) and a baking step (Step S5). In Step S3, together with the two-dimensional code 30, a sputtered film which will become the direction identification mark 40 is formed after the baking step.

In Step S4 subsequent to Step S3, the laminate substrate 54 is divided into the individual regions 56, and a plurality of green chips are formed. Moreover, in Step S5, green chips are baked, and the element body 10 of the multilayer chip component 1 is obtained. The sputtered film formed in Step S3 will become the direction identification mark 40 through baking. The order of the dividing step of Step S4 and the baking step of Step S5 can be reversed. In this case, the element body 10 can be obtained by performing baking in the state of the laminate substrate 54 and then cutting the baked body.

Thereafter, in Step S6, the corners of the element body 10 are rounded through barrel polishing. The barrel polishing may be performed in a state after the dividing step (Step S4) and before the baking step (Step S5) (that is, in a state of green chips). The barrel polishing may be suitably omitted.

Last, the electrodes 20 are respectively provided on the end surfaces 10b and 10c and the side surfaces 10d and 10e of the element body 10, and the multilayer chip component 1 is thereby completed as a finished product.

In the method of manufacturing the multilayer chip component 1 described above, laser processing is used for forming the dots 34 of the two-dimensional code 30. This laser processing is laser processing with respect to the laminate substrate 54 in a state before baking is performed, and an impact at the time of processing is absorbed to a certain degree due to elastic deformation of the laminate substrate 54. For this reason, according to the method of manufacturing the multilayer chip component 1 described above, occurrence of cracking can be curbed compared to laser processing with respect to the element body 10 in a state after baking is performed.

Particularly, when the formation region of the two-dimensional code 30 is narrow as in the multilayer chip component 1, there is a need for a plurality of dots 34 to be formed in a compact manner. In this case, since an impact is concentrated in a narrow region at the time of laser processing, the formation region thereof is under the condition that cracking is likely to occur. Even under such a condition, according to the method of manufacturing the multilayer chip component 1 described above, occurrence of cracking can be curbed.

The two-dimensional code 30 can also be formed in advance in a green sheet which will become the surface layer 12 in addition to being formed in a form of the laminate substrate 54. That is, the two-dimensional code 30 can be formed on the main surface 54a of the laminate substrate 54 by laminating a green sheet in which the two-dimensional code 30 is formed as a green sheet which will become the surface layer 12.

The formation region of the two-dimensional code 30 is designed to have a rectangular shape extending in the long side direction of the element body 10, and thus interference with the electrode 20 can be avoided and a large formation region can be ensured. When the formation region of the two-dimensional code 30 is large, the number of cells for the two-dimensional code 30 can be increased, that is, the number of digits of information can be increased, and thus the two-dimensional code 30 can include more information.

In the multilayer chip component 1, the two-dimensional code 30 indicates the substrate ID identifying the laminate substrate 54 and the individual body ID identifying the individual multilayer chip component 1. That is, the substrate ID and the individual body ID are associated with each other in the two-dimensional code 30. For this reason, it is possible to accurately and quickly discern which laminate substrate 54 a multilayer chip component 1 is manufactured from by reading the two-dimensional code 30 of the multilayer chip component 1. Accordingly, high traceability can be realized. An instrument able to handle the size or the like of the dots 34 can be used for reading the two-dimensional code 30, and a laser microscope can be used in the present embodiment.

The two-dimensional code 30 may be in a form indicating only the individual body ID. The individual body ID may be an ID which can be identified among a plurality of multilayer chip components 1 which can be obtained from one laminate substrate 54 or may be a completely unique ID which can be identified regardless of the laminate substrate 54 from which it is obtained.

When the two-dimensional code 30 indicates information identifying an intermediate product together with the individual body ID, the information identifying an intermediate product may be the sheet ID or the sheet roll ID. In addition, the information identifying an intermediate product indicated by the two-dimensional code 30 may be a plurality of pieces of information of the substrate ID, the sheet ID, and the sheet roll ID. When the two-dimensional code 30 indicates information identifying a plurality of intermediate products, it is possible to more accurately and more quickly discern an intermediate product, and thus higher traceability can be realized.

Figure 7:
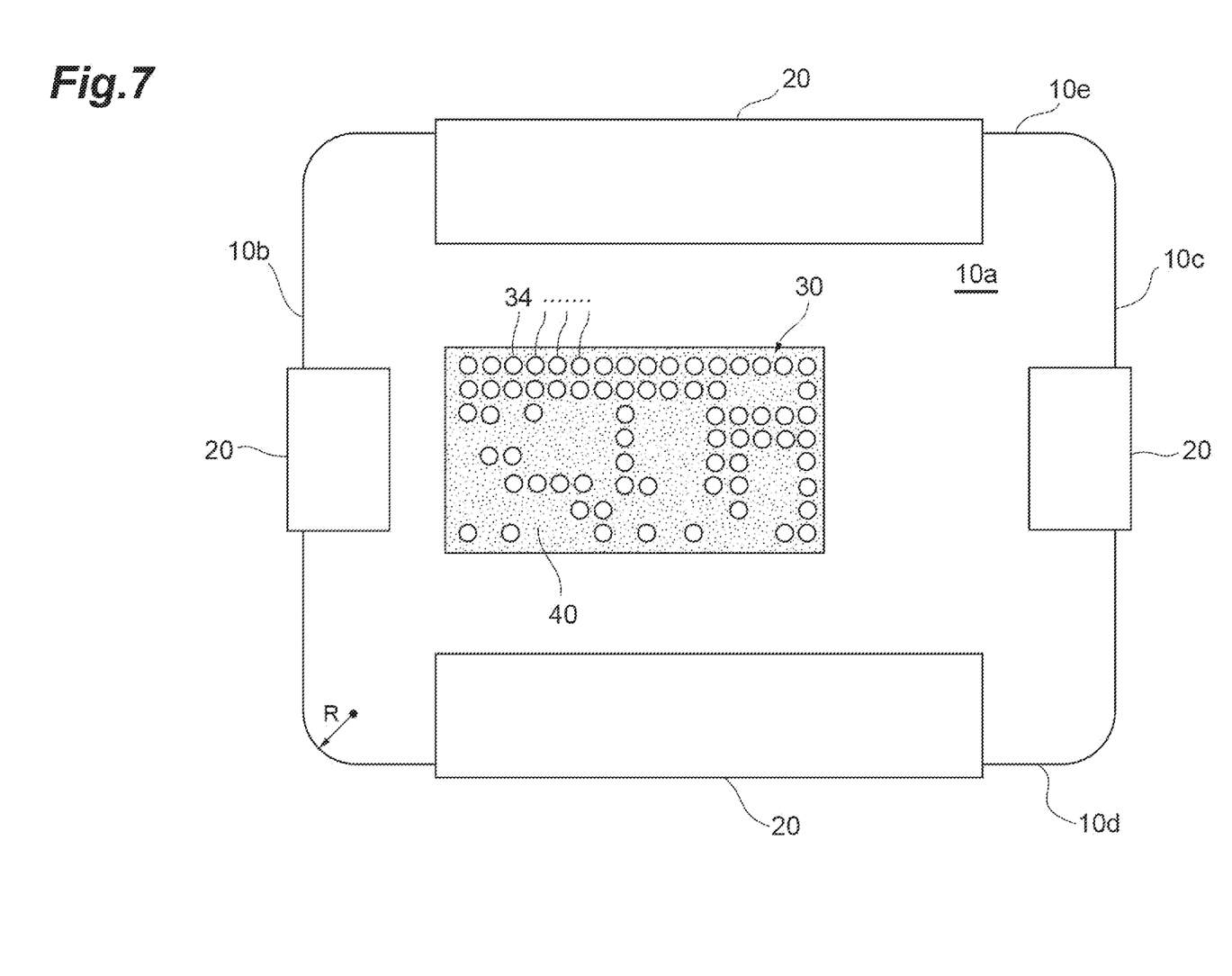
FIG. 7 is a plan view illustrating a multilayer chip component in a different form.

In Step S3, the two-dimensional code 30 may be formed on a sputtered film which will become the direction identification mark 40 provided on the main surface 54a of the laminate substrate 54. In this case, as illustrated in FIG. 7, the two-dimensional code 30 is provided on the direction identification mark 40. When the direction identification mark 40 has a dark color such as black, identifiability of the dots 34 is enhanced due to the color difference between the direction identification mark 40 and the white dots 34.

Figure 8:
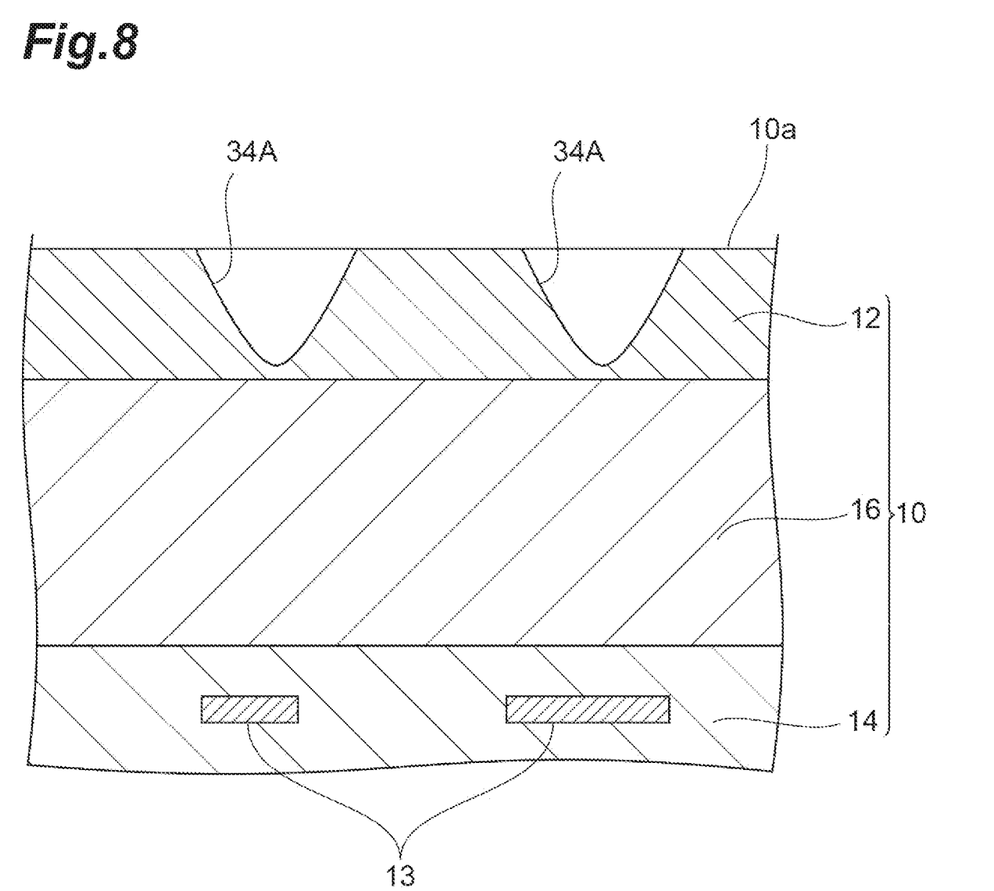
FIG. 8 is a cross-sectional view illustrating dots in a different form.

Since the dots 34 have substantially a semicircular cross-sectional shape, a corner portion in which stress is likely to be concentrated is not present on an inner surface thereof, and thus a situation in which cracking is propagated from the inner surfaces of the dots 34 is effectively curbed. The dots 34 can be variously deformed as long as they have substantially a semicircular cross-sectional shape. For example, as illustrated in FIG. 8, dots 34A having a parabolic cross-sectional shape may be adopted. Inner surfaces of the dots 34A are constituted of only a flat surface and a curved surface, and thus substantially no corner portions are present on the inner surfaces of the dots 34A.

The present disclosure is not limited to the embodiment described above and can be variously modified. For example, the green sheets are not limited to glass, and other dielectric materials, magnetic materials, or the like may be adopted. In addition, the code may include lines (linear grooves) constituted of dots adjacent to each other, in addition to dots. The dots having a circular shape may have a perfectly circular shape, a circular shape distorted to a certain degree, or an oval shape. The dots are not limited to having a circular shape and may have a polygonal shape in a plan view, for example, and may also have a square shape, for example.

What is claimed is:

1. A method of manufacturing a multilayer chip component comprising:
    a step of forming a code including a plurality of dot-shaped recesses arranged through laser processing on a main surface of a laminate substrate, a plurality of green sheets are laminated in the laminate substrate; and
    a step of forming an element body for a multilayer chip component provided with the code on a main surface by performing dividing and baking with respect to the laminate substrate,
    wherein in the element body, a depth of each of the dot-shaped recesses is longer than a separation distance between any two dot-shaped recesses adjacent to each other.

2. The method of manufacturing a multilayer chip component according to claim 1, further comprising a step of rounding corners of the element body by performing barrel polishing of the element body.

3. The method of manufacturing a multilayer chip component according to claim 2, wherein the depth of each of the dot-shaped recesses is shorter than a radius of curvature of the corners of the element body.

4. The method of manufacturing a multilayer chip component according to claim 1, wherein each of the dot-shaped recesses has a circular shape in a plan view.

5. The method of manufacturing a multilayer chip component according to claim 1, wherein the dot-shaped recesses have a semicircular cross-sectional shape.

6. The method of manufacturing a multilayer chip component according to claim 1, wherein the element body includes a surface layer constituting a main surface and a functioning layer positioned inside, and the depth of each of the dot-shaped recesses is shorter than a thickness of the surface layer.

7. The method of manufacturing a multilayer chip component according to claim 1, wherein in the step of forming the code, the code is formed on a film provided on the main surface of the laminate substrate.

8. A method of manufacturing a multilayer chip component comprising:
    a step of forming a code including a plurality of dot-shaped recesses arranged through laser processing on a main surface of a laminate substrate, a plurality of green sheets are laminated in the laminate substrate; and
    a step of forming an element body for a multilayer chip component provided with the code on a main surface by performing dividing and baking with respect to the laminate substrate,
    wherein in the step of forming a code, the code indicating at least information identifying an intermediate product in a previous stage and information identifying an individual finished product is formed.

9. The method of manufacturing a multilayer chip component according to claim 8, wherein the information identifying the intermediate product in a previous stage is information identifying the laminate substrate.

10. The method of manufacturing a multilayer chip component according to claim 8, further comprising a step of rounding corners of the element body by performing barrel polishing of the element body.

11. The method of manufacturing a multilayer chip component according to claim 10, wherein the depth of each of the dot-shaped recesses is shorter than a radius of curvature of the corners of the element body.

12. The method of manufacturing a multilayer chip component according to claim 8, wherein each of the dot-shaped recesses has a circular shape in a plan view.

13. The method of manufacturing a multilayer chip component according to claim 8, wherein the dot-shaped recesses have a semicircular cross-sectional shape.

14. The method of manufacturing a multilayer chip component according to claim 8, wherein the element body includes a surface layer constituting a main surface and a functioning layer positioned inside, and the depth of each of the dot-shaped recesses is shorter than a thickness of the surface layer.

15. The method of manufacturing a multilayer chip component according to claim 8, wherein in the step of forming the code, the code is formed on a film provided on the main surface of the laminate substrate.

16. The method of manufacturing a multilayer chip component according to claim 9, further comprising a step of rounding corners of the element body by performing barrel polishing of the element body.

17. The method of manufacturing a multilayer chip component according to claim 9, wherein each of the dot-shaped recesses has a circular shape in a plan view.

18. The method of manufacturing a multilayer chip component according to claim 9, wherein the dot-shaped recesses have a semicircular cross-sectional shape.

19. The method of manufacturing a multilayer chip component according to claim 9, wherein the element body includes a surface layer constituting a main surface and a functioning layer positioned inside, and the depth of each of the dot-shaped recesses is shorter than a thickness of the surface layer.

20. The method of manufacturing a multilayer chip component according to claim 9, wherein in the step of forming the code, the code is formed on a film provided on the main surface of the laminate substrate.

* * * * *